US009201481B2

(12) United States Patent
Hirosaka (10) Patent No.: US 9,201,481 B2
(45) Date of Patent: Dec. 1, 2015

(54) POWER SUPPLY DISTRIBUTION SYSTEM AND POWER SUPPLY DISTRIBUTION METHOD

(75) Inventor: Shinobu Hirosaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 752 days.

(21) Appl. No.: 13/354,905

(22) Filed: Jan. 20, 2012

(65) Prior Publication Data

US 2012/0200418 A1 Aug. 9, 2012

(30) Foreign Application Priority Data

Feb. 9, 2011 (JP) ................................. 2011-025729

(51) Int. Cl.
| | | |
|---|---|---|
| G06F 1/28 | (2006.01) | |
| G06F 1/32 | (2006.01) | |
| G08B 21/00 | (2006.01) | |
| G06F 1/26 | (2006.01) | |
| H02J 4/00 | (2006.01) | |
| H02J 3/14 | (2006.01) | |

(52) U.S. Cl.
CPC . *G06F 1/266* (2013.01); *H02J 3/14* (2013.01); *H02J 4/00* (2013.01)

(58) Field of Classification Search
CPC ................ G06F 1/266; H02J 3/14; H02J 4/00
USPC .................................. 340/657; 307/31, 35, 39
See application file for complete search history.

(56) References Cited

U.S. PATENT DOCUMENTS

| | | | | |
|---|---|---|---|---|
| 4,310,770 A | * | 1/1982 | Keener et al. ................... 307/35 |
| 4,523,517 A | * | 6/1985 | Cronin ............................ 454/74 |
| 5,754,445 A | | 5/1998 | Jouper et al. |
| 5,823,468 A | * | 10/1998 | Bothe ............................... 244/2 |

(Continued)

FOREIGN PATENT DOCUMENTS

| | | |
|---|---|---|
| JP | 5-018244 U | 3/1993 |
| JP | 2000-502556 A | 2/2000 |

(Continued)

OTHER PUBLICATIONS

English Translation of Japanese Office Action dated Jul. 28, 2015 for the related Japanese Patent Application No. JP2012-025760.

*Primary Examiner* — Rexford Barnie
*Assistant Examiner* — Elim Ortiz
(74) *Attorney, Agent, or Firm* — McDermott Will & Emery LLP (57) ABSTRACT

A power supply distribution system including a power supply for supplying electric power; power outlets to which electronic devices are connected; power detection circuits for measuring an amount of electric power used through each of the power outlets; a power amount arithmetic circuit for determining a supply amount of the electric power to the power outlets based on information from the power detection circuits; and power limiting circuits for limiting the supply amount of the electric power to the power outlets. The power amount arithmetic circuit calculates a threshold of the amount of electric power used to be supplied to each of the power outlets based on a maximum supply amount of the electric power from the power supply and a number of the power outlets; and limits the amount of electric power used to be supplied to some power outlets to not more than the threshold.

7 Claims, 5 Drawing Sheets

(56) References Cited

U.S. PATENT DOCUMENTS

| | | | |
|---|---|---|---|
| 6,046,513 A * | 4/2000 | Jouper et al. | 307/31 |
| 6,124,646 A * | 9/2000 | Artinian et al. | 290/52 |
| 7,207,521 B2 * | 4/2007 | Atkey et al. | 244/58 |
| 7,970,497 B2 * | 6/2011 | Derouineau et al. | 701/3 |
| 8,013,469 B2 * | 9/2011 | Masselus | 307/31 |
| 8,191,834 B2 * | 6/2012 | Westenberger et al. | 244/209 |
| 2010/0133907 A1 * | 6/2010 | Galasso | 307/39 |
| 2011/0270458 A1 * | 11/2011 | Liu | 700/293 |

FOREIGN PATENT DOCUMENTS

| | | | |
|---|---|---|---|
| JP | 2005-045866 | 2/2005 | |
| WO | WO 2010139020 A1 * | 12/2010 | H02J 3/14 |

* cited by examiner

POWER SUPPLY DISTRIBUTION SYSTEM AND POWER SUPPLY DISTRIBUTION METHOD

FIELD OF THE INVENTION

The present invention relates to a distribution system of power supply, more specifically, a power supply distribution system for distributing and supplying electric power to each power outlet for power supply whose maximum supply amount of electric power is determined, and a power supply distribution method.

BACKGROUND OF THE INVENTION

Conventionally, in places, for example, transportation systems such as an aircraft, a ship, or a train in which an amount of electric power to be used is limited, a distribution system of power supply in which the amount of electric power to be supplied to a plurality of power outlets is limited is employed.

In such a distribution system of power supply, for example, Japanese Translation of PCT Publication No. 2000-502556 discloses the following technique: since electric power cannot be supplied beyond the maximum allowable power of the power supply, when the total amount of electric power used at a plurality of power outlets exceeds the maximum supply amount of the power supply, other power outlets are disabled, thus suppressing further increase of supply of electric power.

Figure 5:
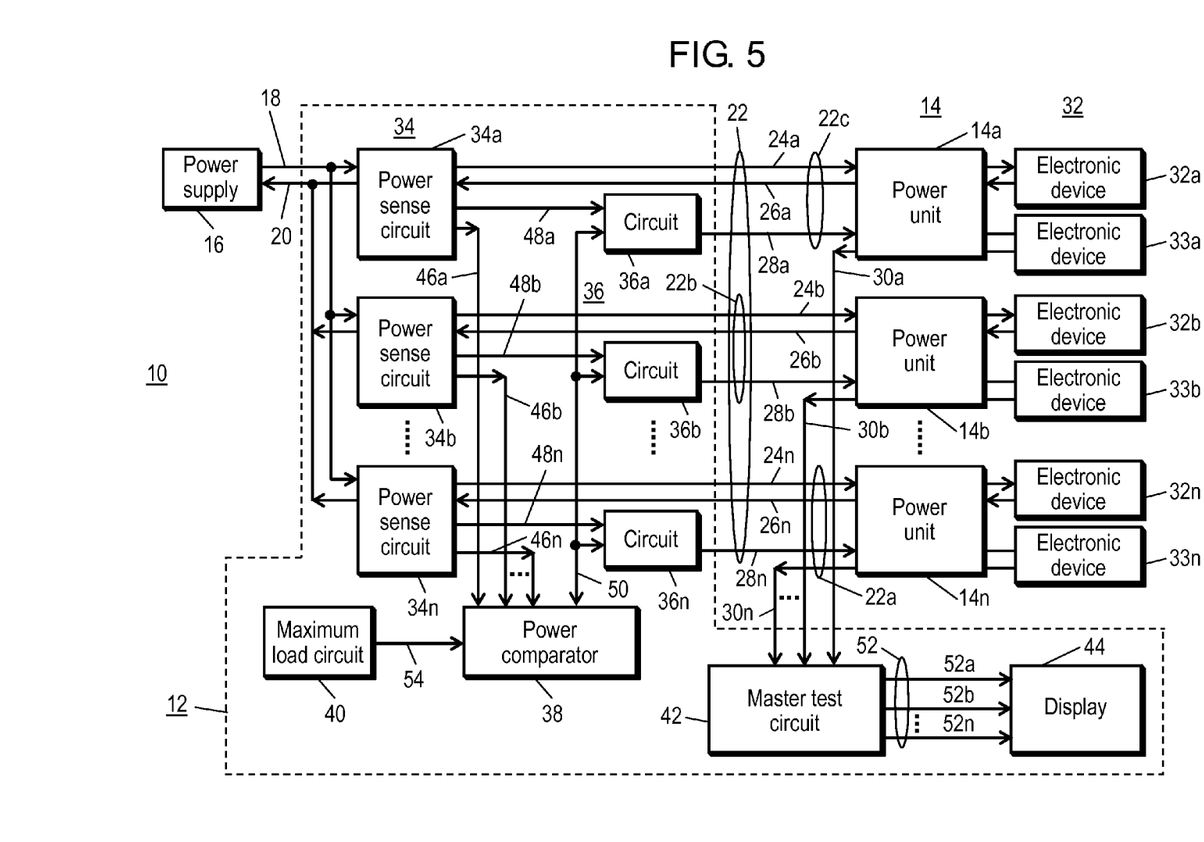
FIG. 5 is a block diagram showing a conventional power supply distribution system.

Hereinafter, technical details of a distribution system of power supply disclosed in Japanese Translation of PCT Publication No. 2000-502556 are described with reference to FIG. 5. FIG. 5 is a block diagram showing a load distribution and management system. As shown in FIG. 5, power distribution circuit 12 receives electric power from power supply 16. Power distribution circuit 12 distributes the received electric power to power units 14a to 14n each having a power outlet. Electronic devices 32a to 32n and electronic devices 33a to 33n are connected to the power outlets of power units 14a to 14n, respectively.

Power distribution circuit 12 includes power sense circuits 34a to 34n. Each of power sense circuits 34a to 34n measures an amount of electric power drawn by each of power units 14a to 14n. Then, power sense circuits 34a to 34n communicate information about the amount of the drawn electric power to power comparator 38.

Each of power sense circuits 34a to 34n also determines whether or not each of power units 14a to 14n exceeds the upper limit value of respective maximum electric power. For example, if it is determined that the amount of electric power being drawn by power unit 14a exceeds the upper limit value of the maximum electric power of power unit 14a, power sense circuit 34a generates a signal.

Power comparator 38 receives the amount of electric power being drawn by each of power units 14a to 14n. Power comparator 38 calculates a total amount of electric power being drawn by summing inputs 46a to 46n. Then, power comparator 38 compares the total amount with threshold input from maximum load circuit 40.

If the total amount of electric power is larger than the threshold value determined by maximum load circuit 40, with respect to each of power units 14a to 14n which are not being used, power units 14a to 14n are stopped via power available circuits (in FIG. 5, simply referred to as "circuit") 36a to 36n, so that supply of electric power cannot be received from the power outlets of the stopped power units.

That is to say, in the above-mentioned configuration, power distribution circuit 12 inhibits the use of other unconnected power units. Furthermore, power distribution circuit 12 supplies electric power preferentially to a firstly connected power unit, and may stop supplying of electric power to a later connected power unit even if it is being used.

Therefore, in a conventional power supply distribution system, when the use of the power outlet is inhibited, even when power consumption is small, for example, when a small device such as a portable telephone is charged, electric power is not supplied. Therefore, convenience for a user is lost.

SUMMARY OF THE INVENTION

A power supply distribution system of the present invention includes a power supply for supplying electric power, a plurality of power outlets, a plurality of power detection circuits, a power amount arithmetic circuit, and a plurality of power limiting circuits. To the plurality of power outlets, electronic devices that receive supply of electric power from the power supply are connected, respectively. The plurality of power detection circuits measures an amount of electric power used through each of the plurality of power outlets. The power amount arithmetic circuit determines a supply amount of electric power to the plurality of power outlets based on information from the plurality of power detection circuits. The plurality of power limiting circuits limits the supply amount of electric power to the plurality of power outlets.

The power amount arithmetic circuit calculates a threshold of an amount of electric power used to be supplied to each power outlet based on a maximum supply amount of electric power from the power supply and a number of power outlets. The power amount arithmetic circuit limits the amount of electric power used to be supplied to a part of the plurality of power outlets to not more than the threshold by using the power limiting circuit.

Furthermore, when the amount of electric power used through one or ore of the power outlets exceeds the threshold, the power amount arithmetic circuit calculates a total sum of the amount of electric power used through the one or more of the power outlets supplying electric power exceeding the threshold, and a total sum of an amount of electric power calculated by multiplying a number of the power outlets whose amount of electric power used is not more than the threshold by the threshold. When a sum of the total sum of the amount of electric power used exceeding the threshold value and the total sum of the amount of electric power exceeds the maximum supply amount of the electric power from the power supply, the power amount arithmetic circuit may limit the amount of electric power used to be supplied to the power outlet, whose amount of electric power used is more than the threshold, to not more than the threshold by using the power limiting circuit.

With such a configuration, although electric power is limited in a part of the plurality of power outlets, all the power outlets connected to the power supply can be supplied with minimum electric power. When the power consumption is small, for example, when a small device is charged, the power outlets can be used by connecting the device thereto.

Furthermore, a power supply distribution method of the present invention includes supplying electric power from power supply to a plurality of power outlets; measuring an amount of electric power used through each of the plurality of power outlets; determining a supply amount of the electric power to the plurality of power outlets based on the measured amount of the electric power used; calculating a threshold of the electric power to be supplied to each of the power outlets based on a maximum supply amount of the electric power from the power supply and a number of the power outlets; and limiting the electric power to be supplied to a part of the plurality of power outlets to the threshold.

Furthermore, the power supply distribution method of the present invention may include detecting that the amount of electric power used through one or more of the power outlets exceeds the threshold; calculating a total sum of the amount of electric power used through the one or more of the power outlets supplying the electric power exceeding the threshold; calculating a total sum of an amount of electric power by multiplying a number of the power outlets, whose amount of electric power used is not more than the threshold, by the threshold; and, when a sum of the total sum of the amount of electric power used and the total sum of the amount of electric power exceeds the maximum supply amount of the electric power from the power supply, limiting the amount of electric power used to be supplied to the power outlet, whose amount of electric power used is more than the threshold, to not more than the threshold by using the power limiting circuit.

DETAILED DESCRIPTION OF PREFERRED EMBODIMENT

First Embodiment

Figure 1:
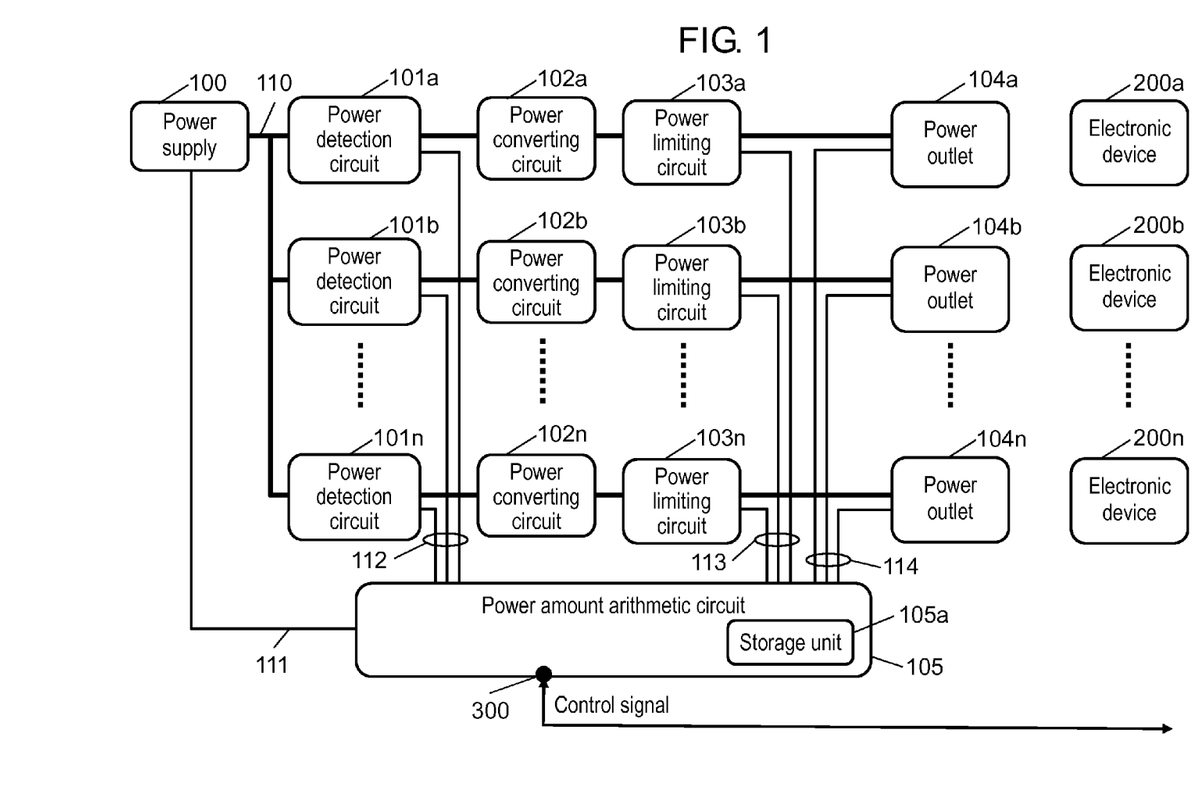
FIG. 1 is a block diagram showing a power supply distribution system in accordance with first and second embodiments of the present invention.
Figure 2:
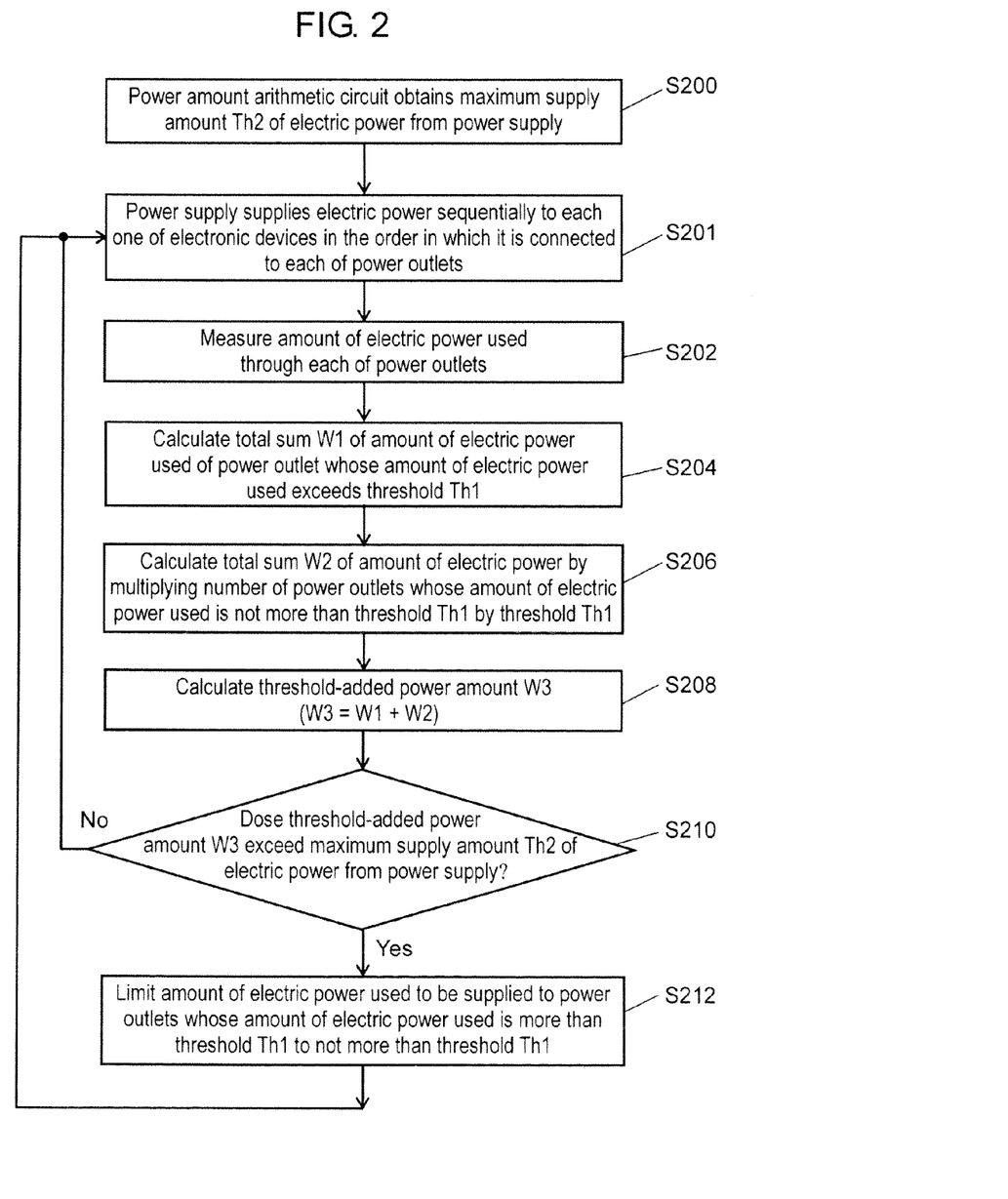
FIG. 2 is a flow chart illustrating an operation of the power supply distribution system in accordance with the first embodiment of the present invention.

Hereinafter, a power supply distribution system in accordance with a first embodiment of the present invention is described with reference to FIGS. 1 and 2. FIG. 1 is a block diagram showing a power supply distribution system in accordance with the first embodiment of the present invention. As shown in FIG. 1, the power supply distribution system includes at least power supply 100, power outlets 104a to 104n (herein, reference numerals 104a to 104n denote any arbitrary integer number), power detection circuits 101a to 101n (herein, reference numerals 101a to 101n denote any arbitrary integer number), power limiting circuits 103a to 103n (herein, reference numerals 103a to 103n denote any arbitrary integer number), and power amount arithmetic circuit 105.

Herein, the number of power outlets 104a to 104n is largely different depending upon specifications of an aircraft, a ship, or a train, and the like, in which the power supply distribution system of this embodiment is applied. For example, it is sufficiently possible that the number is more than 100.

Power supply 100 is coupled to power outlets 104a to 104n respectively by power supply line 110 via power detection circuits 101a to 101n, power converting circuits 102a to 102n, and power limiting circuits 103a to 103n, which are provided for each of power outlets 104a to 104n. Then, power supply 100 supplies electric power to the above-mentioned respective circuits and power outlets 104a to 104n. Furthermore, power supply 100 is coupled to power amount arithmetic circuit 105 by signal line 111. Note here that although not shown, power amount arithmetic circuit 105 may be also supplied with electric power from power supply 100.

To each of power outlets 104a to 104n, each of electronic devices 200a to 200n such as notebook-sized personal computer, a portable terminal or a charger is connected. Power supply 100 supplies electric power to each of electronic devices 200a to 200n connected to each of power outlets 104a to 104n. Furthermore, power outlets 104a to 104n are coupled to power amount arithmetic circuit 105 by signal line 114.

A plurality of power detection circuits 101a to 101n measures an amount of electric power used through the respectively coupled power outlets 104a to 104n. Then, power detection circuits 101a to 101n output information about the measured amount of electric power used to power amount arithmetic circuit 105 by signal line 112.

Power converting circuits 102a to 102n convert a voltage or frequency of electric power supplied from power supply 100. If it is not necessary to convert the voltage or frequency of electric power supplied from power supply 100, power converting circuits 102a to 102n may be omitted.

Power limiting circuits 103a to 103n limit a supply amount of electric power to the respectively connected power outlets 104a to 104n. For example, a current supplied from power outlets 104a to 104n to electronic devices 200a to 200n is controlled so that it does not become a predetermined value or more. Furthermore, power limiting circuits 103a to 103n are coupled to power amount arithmetic circuit 105 by signal line 113.

Power amount arithmetic circuits 105 determines a supply amount of electric power to power outlets 104a to 104n based on information from power detection circuits 101a to 101n.

Furthermore, power amount arithmetic circuit 105 includes storage unit 105a for storing information of power outlets 104a to 104n. Examples of the information of power outlets 104a to 104n include an electric power value, frequency, and a voltage supplied from each of power outlets 104a to 104n to each of electronic devices 200a to 200n, and a maximum value of electric power that can be supplied from power outlets 104a to 104n.

Storage unit 105a is not necessarily provided inside power amount arithmetic circuit 105, it may be provided in each of power outlets 104a to 104n, or it may be provided as a single unit.

An operation of the power supply distribution system configured as mentioned above in accordance with this embodiment is described with reference to a flow chart. FIG. 2 is a flow chart illustrating an operation of the power supply distribution system in accordance with the first embodiment of the present invention.

Firstly, power amount arithmetic circuit 105 obtains maximum supply amount Th2 of electric power from power supply 100 via signal line 111 (Step S200). Each of power limiting circuits 103a to 103n has threshold Th1 for limiting a supply amount of electric power. Herein, maximum supply amount Th2 of electric power from power supply 100 is, for example, 2300 W (115 V, 20 A). Furthermore, threshold Th1 for limiting the supply amount of electric power is about 50 W when electronic devices 200a to 200n are, for example, PC (Personal Computer), about 2.5 W for a portable telephone, and about 5 W for a portable terminal.

Herein, power amount arithmetic circuit 105 may calculate threshold Th1 of the amount of electric power used to be supplied to each of power outlets 104a to 104n based on the maximum supply amount of electric power from power supply 100 and the number of power outlets 104a to 104n. Power amount arithmetic circuit 105 sets threshold Th1 to each of power limiting circuits 103a to 103n. Specifically, for example, it is assumed that 20% of power outlets 104a to 104n receive supply of 50 W of electric power as in PC and the like. The number of power outlets 104a to 104n is assumed to be 230. In this example, when the maximum supply amount of electric power from power supply 100 is 2300 W, threshold Th1 of the amount of electric power used to be supplied to power outlets 104a to 104n may be 50 W.

Threshold Th1 may be, for example, about 100 W in consideration of an allowance of the supply amount of electric power. Furthermore, power outlets 104a to 104n may be divided into some groups, and different thresholds may be set with respect to outlets 104a to 104n of each group. The different threshold is, for example, about 100 W, about 50 W, and about 10 W. Hereinafter, for simplification of description, thresholds Th1 of all of power limiting circuits 103a to 103n are assumed to be, for example, about 100 W.

Power supply 100 supplies each of power outlets 104a to 104n with electric power corresponding to power consumption of each of electronic devices 200a to 200n respectively connected to each of power outlets 104a to 104n. However, electric power is not supplied simultaneously, but it is supplied when each of electronic devices 200a to 200n is connected to each of power outlets 104a to 104n. Therefore, electric power is supplied sequentially to each of power outlets 104a to 104n to which each of electronic devices 200a to 200n is connected (Step S201). The order in which electronic devices 200a to 200n are connected to power outlets 104a to 104n is stored in storage unit 105a.

Then, each of power detection circuits 101a to 101n provided for each of power outlets 104a to 104n measures a respective amount of electric power used through each of power outlets 104a to 104n (Step S202).

Power amount arithmetic circuit 105 regularly or always obtains information about a supply amount of electric power in power outlets 104a to 104n from power detection circuits 101a to 101n.

Then, when the amount of electric power used through one or more of power outlets 104a to 104n exceeds threshold Th1, power amount arithmetic circuit 105 calculates total sum W1 of the amount of electric power used through the one or more of power outlets 104a to 104n supplying electric power exceeding threshold Th1 (Step S204).

Next, power amount arithmetic circuit 105 calculates total sum W2 of an amount of electric power calculated by multiplying a number of power outlets 104a to 104n whose amount of electric power used is not more than threshold Th1 by threshold Th1 (Step S206). Then, power amount arithmetic circuit 105 calculates threshold-added power amount W3 that is a sum of total sum W1 of the amount of electric power used through power outlets 104a to 104n and total sum W2 of the amount of electric power (i.e., W3=W1+W2) (Step S208).

Next, it is determined whether or not threshold-added power amount W3 exceeds maximum supply amount Th2 of electric power from power supply 100 (Step S210). When threshold-added power amount W3 exceeds maximum supply amount Th2 of electric power from the power supply ("Yes" in Step S210), threshold Th1 is set to power limiting circuits 103a to 103n corresponding to power outlets 104a to 104n whose amount of electric power used is more than threshold Th1. That is to say, power amount arithmetic circuit 105 limits an amount of electric power used to be supplied to power outlets 104a to 104n, whose amount of electric power used is more than threshold Th1, to not more than threshold Th1 by using power limiting circuits 103a to 103n (Step S212). As a result, power outlets 104a to 104n cannot use the electric power exceeding threshold Th1. Then, the procedure returns to Step S201 to repeat the series of operations.

On the other hand, when threshold-added power amount W3 is not more than maximum supply amount Th2 of electric power from power supply 100 ("No" in Step S210), the procedure returns to Step S201 to repeat the series of operations.

In this way, until threshold-added power amount W3 exceeds maximum supply amount Th2 of electric power from power supply 100, the series of operations are repeated. Therefore, an amount of electric power to be supplied for each of power outlets 104a to 104n is determined with precedence given to the order in which electronic devices 200a to 200n are connected to power outlets 104a to 104n and the order in which the amount of electric power used exceeds threshold Th1 for limiting a supply amount of the electric power.

That is to say, power amount arithmetic circuit 105 of the power supply distribution system in this embodiment further includes storage unit 105a, and when the amount of electric power used through one or more power outlets 104a to 104n exceeds the threshold Th1, the storage unit 105a stores these power outlets 104a to 104n. Then, when the sum of total sum W1 of the amount of electric power used and total sum W2 of the amount of electric power exceeds maximum supply amount Th2 of electric power from power supply 100, power amount arithmetic circuit 105 limits an amount of electric power used to be supplied to one of power outlets 104a to 104n, the amount of electric power running through one of power outlet 104a to 104n exceeds threshold Th1 lastly among power outlets 104a to 104n, to not more than threshold Th1 by using power limiting circuits 103a to 103n.

As mentioned above, power amount arithmetic circuit 105 of the power supply distribution system in this embodiment stores power outlets 104a to 104n supplying electric power exceeding threshold Th1 in storage unit 105a. Then, when the electric power from power supply 100 exceeds maximum supply amount Th2, power amount arithmetic circuit 105 limits an amount of electric power used through one of power outlets 104a to 104n connected last among power outlets 104a to 104n supplying electric power exceeding threshold Th1 to not more than threshold Th1. As a result, the power supply distribution system of this embodiment can correspond to the increase in electric power during use of electronic devices 200a to 200n so as not to exceed maximum supply amount Th2 of electric power from power supply 100 by giving precedence to power outlets 104a to 104n in the order in which electronic devices 200a to 200n are connected thereto.

As mentioned above, power amount arithmetic circuit 105 of the power supply distribution system in accordance with this embodiment calculates threshold Th1 of an amount of electric power used to be supplied to each of power outlets 104a to 104n based on the maximum supply amount of electric power from power supply 100 and the number of power outlets 104a to 104n. Furthermore, power amount arithmetic circuit 105 limits an amount of electric power used to be supplied to a part of power outlets 104a to 104n to not more than threshold Th1 by using power limiting circuits 103a to 103n.

In this way, based on the precedence of the order in which electronic devices 200a to 200n are connected, an amount of electric power used exceeding threshold Th1 is preferentially supplied to some power outlets 104a to 104n, while electric power supply up to threshold Th1 can be secured even in other power outlets 104a to 104n to which precedence is not given.

In this way, minimum electric power can be supplied from all of power outlets 104a to 104n. When power consumption is small, for example, when a small device such as a portable telephone is charged, any of power outlets 104a to 104n can be used.

Note here that as shown in FIG. 1, power amount arithmetic device 105 in accordance with this embodiment includes data input/output terminal 300, and may communicate to external devices by a control signal. The communication is carried out with respect to, for example, a central control unit of an aircraft, a ship, or a train (not shown) in which the power supply distribution system of the present invention is applied. The control signal in this embodiment includes threshold Th1 for limiting a supply amount of electric power, total sum W1 of an amount of electric power used, total sum W2 of an amount of electric power, the number of actually used power outlets 104a to 104n, and the number of power outlets 104a to 104n supplying electric power exceeding threshold Th1. Furthermore, when abnormality of each circuit of the power supply distribution system is detected, portions or contents of abnormality may be included in the control signal. By appropriately displaying these data by the central control unit, the status of the system can be easily understood, which is useful for safe operation. Furthermore, by controlling threshold Th1 for limiting the supply amount of electric power by the central control unit, an amount of electric power used to be supplied to power outlets 104a to 104n can be managed more flexibly.

Second Embodiment

Figure 3:
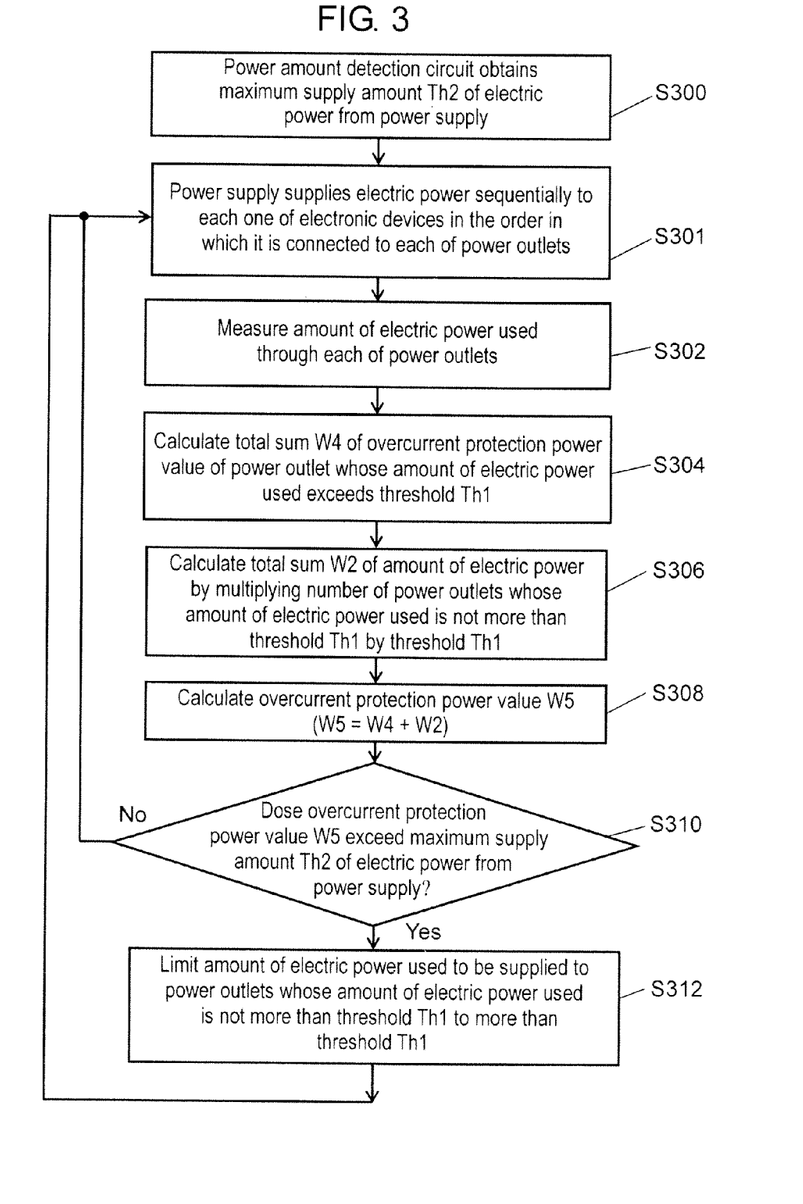
FIG. 3 is a flow chart illustrating an operation of the power supply distribution system in accordance with the second embodiment of the present invention.

Next, power supply distribution system in accordance with a second embodiment of the present invention is described with reference to FIGS. 1 and 3. A configuration of this embodiment is the same as that shown in FIG. 1 in the first embodiment.

The second embodiment is different from the first embodiment in that the second embodiment uses overcurrent protection power value Th3 of each of power outlets 104a to 104n instead of an amount of electric power used through each of power outlets 104a to 104n. That is to say, power limiting circuits 103a to 103n have overcurrent protection power value Th3, and always monitor whether an amount of electric power used does not exceed overcurrent protection power value Th3.

Overcurrent protection power value Th3 is set in order to prevent that an excessive amount of electric current flows, and thereby signal line 111 or circuits connected thereto are broken or excessively heated when electronic devices 200a to 200n such as notebook-sized personal computer, a portable terminal and a charger which are connected to power outlets 104a to 104n are broken. Overcurrent protection power value Th3 may be, for example, about 150 W to 250 W.

Next, an operation of the power supply distribution system of this embodiment is described with reference to a flow chart. FIG. 3 is a flow chart illustrating an operation of the power supply distribution system in accordance with the second embodiment of the present invention.

Firstly, power amount arithmetic circuit 105 obtains maximum supply amount Th2 of electric power from power supply 100 (Step S300). Each of power limiting circuits 103a to 103n has threshold Th1 for limiting a supply amount of electric power and overcurrent protection power value Th3 that is a larger value than threshold Th1. Herein, threshold Th1 is, for example, about 100 W similar to the first embodiment.

Power supply 100 supplies electric power corresponding to power consumption of electronic devices 200a to 200n respectively connected to power outlets 104a to 104n. However, electric power is not supplied simultaneously, but it is supplied when each of electronic devices 200a to 200n is connected to each of power outlets 104a to 104n. Therefore, electric power is supplied sequentially to each of power outlets 104a to 104n in the order in which each of electronic devices 200a to 200n is connected thereto (Step S301). The order in which electronic devices 200a to 200n are connected to power outlets 104a to 104n is stored in storage unit 105a.

Then, each of power detection circuits 101a to 101n provided in each of power outlets 104a to 104n measures a respective amount of electric power used through each of power outlets 104a to 104n (Step S302).

Power amount arithmetic circuit 105 regularly or always obtains information about an amount of electric power in power outlets 104a to 104n from power detection circuits 101a to 101n.

Then, when the amount of electric power used through one or more of power outlets 104a to 104n exceeds threshold Th1, power amount arithmetic circuit 105 calculates total sum W4 of overcurrent protection power values Th3 of one or more of power outlets 104a to 104n supplying electric power exceeding threshold Th1 (Step S304). Next, power amount arithmetic circuit 105 calculates total sum W2 of an amount of electric power calculated by multiplying a number of power outlets 104a to 104n whose amount of electric power used is not more than threshold Th1 by threshold Th1 (Step S306). Then, power amount arithmetic circuit 105 calculates overcurrent-added power amount W5 that is a sum of total sum W4 of overcurrent protection power values Th3 of power outlets 104a to 104n supplying electric power exceeding threshold Th1 and total sum W2 of an amount of electric power (that is, W5=W4+W2) (Step S308).

Next, it is determined whether or not overcurrent-added power amount W5 exceeds maximum supply amount Th2 of electric power from power supply 100 (Step S310). When overcurrent-added power amount W5 exceeds maximum supply amount Th2 of electric power from the power supply ("Yes" in Step S310), threshold Th1 is set to power limiting circuits 103a to 103n with respect to the power outlets whose amount of electric power used is more than threshold Th1 (Step S312). That is to say, power amount arithmetic circuit 105 limits electric power to be supplied to power outlets 104a to 104n, whose amount of electric power used is more than threshold Th1, to not more than threshold Th1 by using power limiting circuits 103a to 103n. As a result, power outlets 104a to 104n cannot use electric power exceeding threshold Th1. Then, the procedure returns to Step S301 to repeat the series of operations.

On the other hand, when overcurrent-added power amount W5 is not more than maximum supply Th2 of electric power from power supply 100 ("No" in Step S310), the procedure returns to Step S301 to repeat the series of operations.

In this way, until overcurrent-added power amount W5 exceeds maximum supply amount Th2 of electric power from power supply 100, the series of operations are repeated. Therefore, an amount of electric power to be supplied for each of power outlets 104a to 104n is determined with precedence given to the order in which electronic devices 200a to 200n are connected to power outlets 104a to 104n and the order in which the amount of electric power used exceeds threshold Th1 for limiting the supply amount of the electric power.

That is to say, power amount arithmetic circuit 105 of the power supply distribution system in this embodiment further includes storage unit 105a, and when the amount of electric power used through one or more power outlets 104a to 104n exceeds the threshold Th1, the storage unit 105a stores these power outlets 104a to 104n. Then, when overcurrent-added power amount W5 that is a sum of total sum W4 of overcurrent protection power value Th3 and total sum W2 of the amount of electric power exceeds the maximum supply amount of electric power from power supply 100, power amount arithmetic circuit 105 limits an amount of electric power used to be supplied to one of power outlets 104a to 104n, the amount of electric power running through one of power outlet 104a to 104n exceeds threshold Th1 lastly among power outlets 104a to 104n, to not more than threshold Th1 by using power limiting circuits 103a to 103n.

As mentioned above, power amount arithmetic circuit 105 of the power supply distribution system in this embodiment stores power outlets 104a to 104n supplying electric power exceeding threshold Th1 in storage unit 105a. Then, when the electric power from power supply 100 exceeds maximum supply amount Th2, power amount arithmetic circuit 105 limits an amount of electric power used through one of power outlets 104a to 104n that is connected last among power outlets 104a to 104n supplying electric power exceeding threshold Th1 to not more than threshold Th1. As a result, the power supply distribution system of this embodiment can correspond to the increase in electric power during use of electronic devices 200a to 200n so as not to exceed maximum supply amount Th2 of electric power from power supply 100 by giving precedence to the order in which electronic devices 200a to 200n are connected to power outlets 104a to 104n.

Furthermore, similar to the first embodiment, based on the precedence of the order in which electronic devices 200a to 200n are connected, electric power exceeding threshold Th1 is preferentially supplied to some power outlets 104a to 104n, while electric power supply up to threshold Th1 can be secured even in the other power outlets 104a to 104n which precedence is not given.

Furthermore, since control is carried out by using overcurrent protection power value Th3 of power outlets 104a to 104n to which precedence is given as the maximum electric power, even if electric power is increased during use of electronic devices 200a to 200n, the limitation of other power outlets 104a to 104n is not influenced.

This enables minimum power supply from all of power outlets 104a to 104n. That is to say, when power consumption is small, for example, when a small device such as a portable telephone is charged, any of power outlets 104a to 104n can be used. Furthermore, power outlets 104a to 104n supplying electric power exceeding threshold Th1 can correspond to the increase of an amount of electric power during use of electronic devices 200a to 200n.

Third Embodiment

Figure 4:
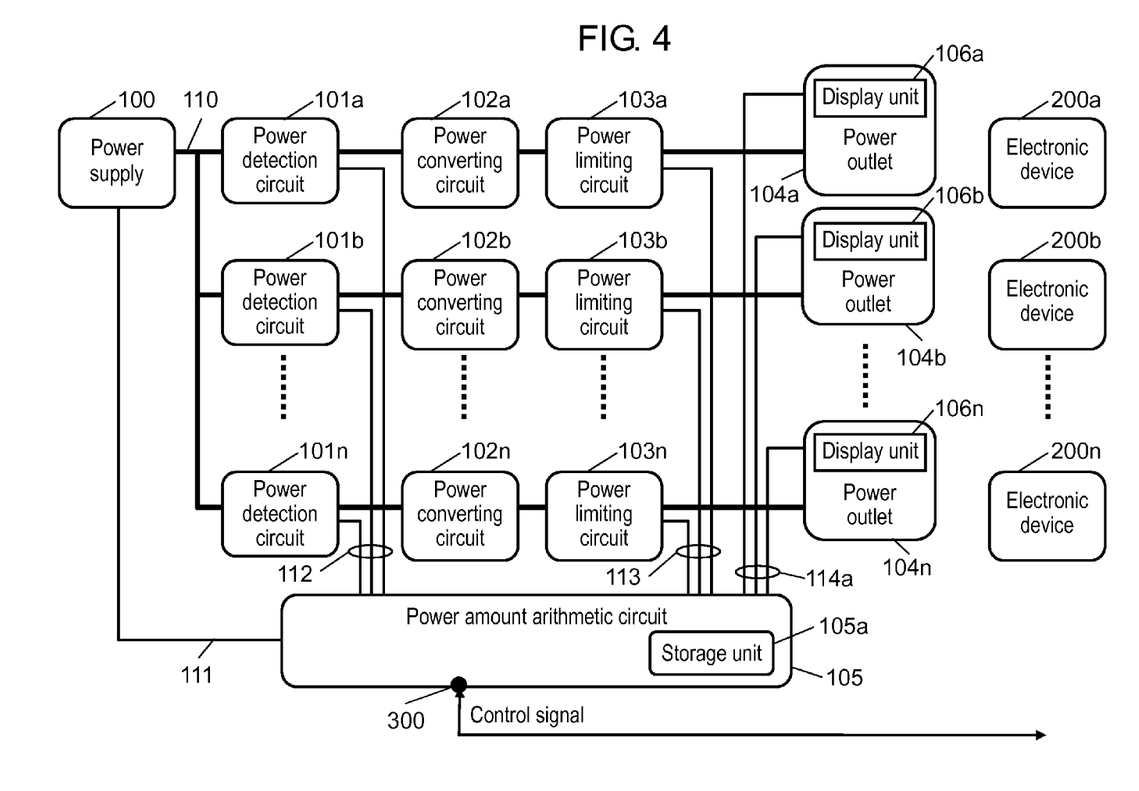
FIG. 4 is a block diagram showing a power supply distribution system in accordance with a third embodiment of the present invention.

Next, a power supply distribution system in accordance with a third embodiment of the present invention is described with reference to FIG. 4. The third embodiment is different from the first embodiment in that allowable power display units (abbreviated as "display unit" in FIG. 4) 106a to 106n for displaying usable electric power are provided in respective power outlets 104a to 104n. Hereinafter, an operation of the power supply distribution system of this embodiment is described.

In this embodiment, control for distribution of power supply may be carried out by any of the method of the first embodiment and the method of the second embodiment.

In this embodiment, each of power outlets 104a to 104n includes each of allowable power display units 106a to 106n for displaying usable electric power, which is calculated by power amount arithmetic circuit 105, for each of power outlets 104a to 104n. Therefore, a user can know the state of the present limit value of electric current. Therefore, a user can immediately determine whether or not electronic devices 200a to 200n intended to be connected are usable. Therefore, it is possible to prevent occurrence of failure due to shortage of electric power after connection.

Furthermore, when a used amount of electric current from power outlets 104a to 104n exceeds threshold Th1 for limiting electric current, allowable power display units 106a to 106n may display a warning. In this case, since a user can easily understand that the electric power exceeds an electric current limited value, power outlets 104a to 104n can be used easily.

Allowable power display units 106a to 106n may be a liquid crystal display device capable of displaying numeric values, or may use a plurality of light emitting diodes (LED) to allow them to be lighted in the vicinity of the printed numeric values. Alternatively, if only a warning display is carried out, lighting or blinking of one LED may be used to call attention.

What is claimed is:

1. A power supply distribution system, comprising:
a power supply for supplying electric power;
a plurality of power outlets to which electronic devices that receive supply of electric power from the power supply are connectable;
a plurality of power detection circuits for measuring an amount of electric power used through each of the plurality of power outlets;
a power amount arithmetic circuit for determining a supply amount of the electric power to the plurality of power outlets based on information from the plurality of power detection circuits; and
a plurality of power limiting circuits for limiting the supply amount of the electric power to the plurality of power outlets, wherein:
the power amount arithmetic circuit:
calculates a threshold of the amount of electric power used to be supplied to each of the power outlets based on a maximum supply amount of the electric power from the power supply and a number of the power outlets; and
limits the amount of electric power used to be supplied to at least one of the plurality of power outlets, whose amount of electric power measured by the power detection circuits is more than the threshold, to not more than the threshold by using the power limiting circuit,
when the amount of electric power used through one or more of the power outlets exceeds the threshold, the power amount arithmetic circuit calculates:
a first total sum that is a total sum of the amount of electric power used through the one or more of the power outlets supplying electric power exceeding the threshold, and
a second total sum that is a total sum of an amount of electric power calculated by multiplying a number of the power outlets whose amount of electric power used is not more than the threshold by the threshold; and
when a sum of the first total sum and the second total sum exceeds the maximum supply amount of the electric power from the power supply, the power amount arithmetic circuit allows electric power to be used to be supplied to the power outlet, but limits the amount of electric power used to be supplied to the power outlet, whose amount of electric power used is more than the threshold, to not more than the threshold by using the power limiting circuit.

2. The power supply distribution system according to claim 1,
wherein the power amount arithmetic circuit further comprises a storage unit, and when the amount of electric power used through one or more power outlets exceeds the threshold, the storage unit stores these one or more power outlets, and
when the sum of the first total sum and the second total sum exceeds the maximum supply amount of the electric power from the power supply, the power amount arithmetic circuit allows electric power to be used to be supplied to, but limits an amount of electric power used to be supplied to one of the power outlets, the amount of electric power running through this one power outlet exceeds the threshold lastly among the power outlets, to not more than the threshold by using the power limiting circuit, while the electric power is available at power outlets to which electronic devices are connected.

3. The power supply distribution system according to claim 1,
wherein each of the power outlets further comprises an allowable power display unit, and
the allowable power display unit displays a usable amount of electric power for each of the power outlets, which is calculated by the power amount arithmetic circuit.

4. The power supply distribution system according to claim 3,
wherein the allowable power display unit displays a warning when a supply amount of electric power from each of the power outlets exceeds the threshold.

5. The power supply distribution system according to claim 4, wherein the display of the warning is done by lighting or blinking LED (Light Emitting Diode).

6. A power supply distribution method, comprising:
supplying electric power from power supply to a plurality of power outlets;
measuring an amount of electric power used through each of the plurality of power outlets;
determining a supply amount of the electric power to the plurality of power outlets based on the measured amount of the electric power used;
calculating a threshold of the amount of electric power used to be supplied to each of the power outlets based on a maximum supply amount of the electric power from the power supply and a number of the power outlets;
limiting the electric power to be supplied to at least one of the plurality of power outlets, whose amount of electric power measured by the power detection circuits is more than the threshold, to not more than the threshold;
detecting that the amount of electric power used through one or more of the power outlets exceeds the threshold;
calculating a first total sum that is a total sum of the amount of electric power used through the one or more of the power outlets supplying the electric power exceeding the threshold;
calculating a second total sum that is a total sum of an amount of electric power by multiplying a number of the power outlets, whose amount of electric power used is not more than the threshold, by the threshold; and
when a sum of the first total sum and the second total sum exceeds the maximum supply amount of the electric power from the power supply, allowing electric power to be used to be supplied to the power outlet, but limiting the amount of electric power used to be supplied to the power outlet, whose amount of electric power used is more than the threshold, to not more than the threshold by using the power limiting circuit.

7. The power supply distribution method according to claim 6, comprising:
when the amount of electric power used through one or more of the power outlets exceeds the threshold, storing the power outlets exceeding the threshold; and
when the sum of the first total sum and the second total sum exceeds the maximum supply amount of the electric power from the power supply, allowing electric power to be used to be supplied to the power outlet, but limiting an amount of electric power used to be supplied to one of the power outlets, the amount of electric power running through this one power outlet exceeds the threshold lastly among the power outlets, to not more than the threshold by using the power limiting circuit, while the electric power is available at power outlets to which electronic devices are connected.

* * * * *